United States Patent
Kogo et al.

(10) Patent No.: US 12,187,204 B2
(45) Date of Patent: Jan. 7, 2025

(54) ON-VEHICLE NETWORK SYSTEM AND ELECTRONIC CONTROL DEVICE

(71) Applicant: Hitachi Astemo, Ltd., Hitachinaka (JP)

(72) Inventors: Kenji Kogo, Hitachinaka (JP); Koji Maeda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 250 days.

(21) Appl. No.: 17/921,550

(22) PCT Filed: Jan. 22, 2021

(86) PCT No.: PCT/JP2021/002154
§ 371 (c)(1),
(2) Date: Oct. 26, 2022

(87) PCT Pub. No.: WO2021/220564
PCT Pub. Date: Nov. 4, 2021

(65) Prior Publication Data
US 2023/0166678 A1    Jun. 1, 2023

(30) Foreign Application Priority Data

Apr. 28, 2020    (JP) ................................. 2020-078871

(51) Int. Cl.
*B60R 16/023*    (2006.01)
*H04B 3/54*    (2006.01)

(52) U.S. Cl.
CPC ............. *B60R 16/023* (2013.01); *H04B 3/54* (2013.01)

(58) Field of Classification Search
CPC .... B60R 16/023; H04B 3/54; H02J 13/00007; H05B 47/185

(Continued)

(56) References Cited

U.S. PATENT DOCUMENTS 10,919,468 B2 *  2/2021  Taoka .................... B60L 3/0046
10,946,818 B2 *  3/2021  Takamatsu .............. B60R 16/02

(Continued)

FOREIGN PATENT DOCUMENTS

| JP | 2010-258769 A | 11/2010 |
| JP | 2019-146415 A | 8/2019 |

(Continued)

OTHER PUBLICATIONS

English Translation of the International Search Report issued in corresponding International Application No. PCT/JP2021/002154, dated Apr. 13, 2021.

*Primary Examiner* — Hal Kaplan
(74) *Attorney, Agent, or Firm* — Foley & Lardner LLP

(57) ABSTRACT

As the level of autonomous driving of an automobile is improved, traveling in a system without a driver is required, and high reliability of the system is essential. One method for achieving high reliability is redundancy of a power supply. To construct a redundant power supply network, a redundant power supply network is required in addition to a main power supply network, and the number of wires of the network increases. In addition, since a cable having a thick core wire is used as a power supply wiring in order to handle a large current, the weight of the cable becomes heavy, which leads to fuel consumption degradation of the vehicle. An electronic control device 11-B receives power fed from a power storage unit 12-A via another electronic control device 11-A, as a redundant power supply redundant to a power superimposition data wiring 16. That is, the electronic control device 11-B receives power fed or transmitted from both the directly-connected power storage unit 12-B and the indirectly-connected power storage unit 12-A.

17 Claims, 12 Drawing Sheets

(58) Field of Classification Search
USPC .................................................. 307/9.1, 10.1
See application file for complete search history.

(56) References Cited

U.S. PATENT DOCUMENTS

| | | |
|---|---|---|
| 2016/0173290 A1 | 6/2016 | Yamada |
| 2019/0126865 A1 | 5/2019 | Takamatsu et al. |
| 2019/0256018 A1 | 8/2019 | Taoka et al. |

FOREIGN PATENT DOCUMENTS

| | | |
|---|---|---|
| WO | WO-2014/188633 A1 | 11/2014 |
| WO | WO-2017/222077 A1 | 12/2017 |

\* cited by examiner (a) FILTER CONFIGURATION ((−) WIRING OF POWER SUPPLY IS NOT ILLUSTRATED)

((−) WIRING OF POWER SUPPLY IS NOT ILLUSTRATED)

((−) WIRINGS OF SENSOR AND POWER SUPPLY ARE NOT ILLUSTRATED)

((−) WIRING OF POWER SUPPLY IS NOT ILLUSTRATED)

((−) WIRING OF POWER SUPPLY IS NOT ILLUSTRATED)

((−) WIRINGS OF SENSOR AND POWER SUPPLY ARE NOT ILLUSTRATED)

((−) WIRINGS OF SENSOR AND POWER SUPPLY ARE NOT ILLUSTRATED)

(a) VOLTAGE WAVEFORM OF DATA WIRING 16

(b) VOLTAGE WAVEFORM OF POWER SUPPLY WIRING (15-A OR 15-B)

ON-VEHICLE NETWORK SYSTEM AND ELECTRONIC CONTROL DEVICE

TECHNICAL FIELD

The present invention relates to an electronic control device and a network architecture (network system) including the electronic control device. Among the electronic control devices and the network architectures, the present invention particularly relates to an on-vehicle electronic control device and an on-vehicle network architecture system.

BACKGROUND ART

In recent years, there have been social problems such as reduction of the number of traffic accidents, reduction of damage, and provision of transportation means and the like to vulnerable road users, and technical development for realizing autonomous driving of vehicles has been advanced. Examples of functions required for the autonomous driving level are defined by Society of Automotive Engineers (SAE). In the SAE, regarding the responsibility of an accident that has occurred, a driver is defined for a vehicle having the autonomous driving level of 2 or lower, and a system is defined for a vehicle of Level 3 or higher. Level 3 refers to conditional autonomous driving, in which the system normally controls driving control and monitors the surroundings, and the driver travels only in an emergency. At this level, since the driver does not always hold the steering wheel, it is not possible to immediately transfer the control of the vehicle to the driver. Therefore, it is required to travel safely on the system side for a time until the system detects a failure and transfers the control of the vehicle to the driver. That is, it is necessary to construct a redundant system that does not completely stop the system even in an occurrence of a failure and performs transfer to a degeneration system having limited functions and the like to perform traveling.

In the autonomous driving of Level 2, the subject of the driving control is the driver, the system is for the purpose of driving assistance, and the system is a single system. FIG. 13 is a schematic diagram of a single system configuration of Level 2 or lower by using a brake as an example. An actuator (brake) 10 performs braking by a signal from an electronic control device 11. The electronic control device 11 is driven by electric power fed from a power storage unit 12 mounted on the vehicle via a power supply wiring 15, and monitors the surroundings based on information from a sensor 13 (front monitoring radar or the like). When determining an occurrence of danger, the electronic control device 11 transmits a stop signal to the actuator (brake) 10. Even though a portion of the system fails and cannot operate normally, the driver is responsible for driving control, and the driver is to depress the brake and stop, so that there is no problem for a system. On the other hand, in the autonomous driving of Level 3 or higher, the subject of the driving control is transferred to the system, and thus a situation in which there is no driver is considered. Under such a situation, even though a portion of the system fails, the system is required to be safely stopped, and redundancy of the system is essential. FIG. 14 illustrates a schematic diagram of a dual system configuration of Level 3 or higher by using the brake as an example. The single system including power storage units 12-A and 12-B and power supply wirings 15-A and 15-B is parallelized to form a dual system. With this configuration, even though one system fails, the other system can stop the vehicle. In the field of autonomous driving, it is considered that failures occurring at the same time may be considered as being at one place. However, even if only a portion of the power storage unit or the power supply unit fails, the entire system is affected. Thus, in particular, redundancy of two independent systems is essential.

In addition, since the system is the subject of driving control at Level 3 or higher, surrounding monitoring is required in a wide range and with high accuracy. Therefore, in a camera sensor that is a type of the sensor 13, high resolution is achieved by setting the number of pixels from 2 M pixels to 8 M pixels, and the image quality is changed to clearer image quality to improve the detection accuracy. As described above, the amount of data required for traveling rapidly increases, and the architecture configuration of the in-vehicle network has changed. FIG. 15 illustrates a zone architecture using a backbone applied at Level 3 or higher. The zone architecture represents a structure in which the electronic control device 11 disposed in each area of the vehicle is installed, and each sensor 13 is connected to the electronic control device 11 in each area. The electronic control devices 11 in each area are configured to be connected and perform transmission in a backbone network which is a high-speed data wiring 14 of 10 Gbps class, and it is necessary to construct a highly reliable system in this architecture.

CITATION LIST

Patent Literature

PTL 1: WO 2017/222077

SUMMARY OF INVENTION

Technical Problem

In recent years, redundancy of an on-vehicle network system along with a change in architecture of a vehicle network has been a problem. FIG. 16 illustrates an on-vehicle backbone network configuration in a daisy chain disclosed in PTL 1. In PTL 1, two independent power storage units 12-A and 12-B are mounted in a vehicle, and are connected by the power supply wiring 15 via a power changeover switch 27. The power supply wiring 15 is used as a backbone network of the daisy chain to connect the electronic control device 11. The electronic control devices 11 communicate with each other by superimposing data on the power supply wiring 15. Normally, power is fed only from the power storage unit 12-A, but, when a failure occurs due to cable disconnection, the power changeover switch 27 is turned ON, and power is also fed from the power storage unit 12-B. In this manner, redundancy of the system is realized. This configuration has a configuration in which signals are superimposed on the power supply wirings 15-A and 15-B. The power supply wirings 15-A and 15-B are not designed in impedance, and it is difficult to perform data communication of 10 Gbps class. Therefore, it is difficult to apply camera data to a system of Level 3 or higher because it is impossible to transmit the camera data. In addition, a wireless communication is assumed as data communication at the time of cable failure, but it is extremely dangerous to transmit important data on vehicle control or the like by wireless communication with communication reliability lower than wired communication.

In the redundancy of the power supply required in the system of Level 3 or higher, it is necessary to install at least three networks of a main power supply network, a redundant power supply network, and a data wiring network in the entirety of the vehicle by wired cables. Therefore, the number of wirings increases, leading to an increase in the weight of the wire harness.

In view of the above problems, an object of the present invention is to provide an electronic control device capable of making a power supply redundant with a simpler structure, and an on-vehicle network system using the electronic control device. Such a structure includes efficient wiring use. In addition, the efficient wiring use includes realizing redundancy by adding a smaller number of wirings as compared with a case where redundancy is not performed.

Solution to Problem

In order to achieve the above-described object, in the present invention, a redundant power supply is superimposed on a data wiring between electronic control devices. In a certain electronic control device, power fed from a power supply device via another electronic control device is received as a redundant power supply redundant to the data wiring. Alternatively, in a certain electronic control device, the power fed from the power supply device is redundantly transmitted to the data wiring to another electronic control device. In other words, in the present invention, power fed or transmitted from both the directly-connected power supply device and the indirectly-connected power supply device is received.

As a representative aspect of the present invention, there is provided an on-vehicle network system including a plurality of electronic control devices that output control signals to a control target. The on-vehicle network system includes a plurality of power supply devices that supply power to any one of the plurality of electronic control devices, and a first electronic control device included in the plurality of electronic control devices, the first electronic control device including a first power supply connection unit that is connected with a first power supply device included in the plurality of power supply devices via a first power supply wiring and receives power from the first power supply device, and a first data wiring connection unit that is connected to a second electronic control device included in the plurality of electronic control devices via a first data wiring for transmission and reception of data. The second electronic control device includes a second power supply connection unit that is connected to a second power supply device included in the plurality of power supply devices via a second power supply wiring and receives power from the second power supply device, and a second data wiring connection unit that transmits power fed from the second power supply device to the first electronic control device via the first data wiring with being superimposed on the data.

Furthermore, as another aspect of the present invention, there is provided an electronic control device that outputs a control signal to a control target. The electronic control device includes a power supply connection unit connected to a first power supply device included in a plurality of power supply devices via a power supply wiring, and a data wiring connection unit connected to a second electronic control device that receives power from a second power supply device, via a data wiring for transmission and reception of data. The data wiring connection unit transmits power fed from the first power supply device to the second electronic control device with being superimposed on the data. In addition, as another electronic control device, there is provided an electronic control device that outputs a control signal to a control target. The electronic control device includes a power supply connection unit connected to a first power supply device included in a plurality of power supply devices via a power supply wiring, and a data wiring connection unit connected to a second electronic control device via a data wiring for transmission and reception of data. The data wiring connection unit receives power from a second power supply device connected to the second electronic control device that superimposes the power on the data, from the second electronic control device via the data wiring.

Furthermore, there is provided an on-vehicle network system that processes a control signal for a control target.

The on-vehicle network system includes a plurality of power supply devices, a plurality of electronic control devices, a power supply wiring that connects any of the plurality of electronic control devices and any of the plurality of power supply devices, and a data wiring that connects the plurality of electronic control devices with each other, superimposes power fed from any one of the plurality of power supply devices on data transmitted and received between the electronic control devices, and transmits and receives the power superimposed on the data. Each of the plurality of electronic control devices includes a power reception unit that receives power from the power supply wiring or the data wiring. A relationship between a total number of the plurality of electronic control devices and a total number of power supply wirings respectively connected to the plurality of electronic control devices satisfies an expression of (the number of the electronic control devices)×2>(the total number of the power supply wirings) (the total number of the plurality of electronic control devices). Drive power is made redundant in each of the plurality of electronic control devices.

Note that the present invention also includes a method using the electronic control device and the on-vehicle network system described above. Furthermore, the present invention includes software and program products used in the electronic control device and the on-vehicle network system.

Advantageous Effects of Invention

According to the present invention, it is possible to provide an electronic control device in which a power supply is made redundant with a simple structure and an on-vehicle network system using the electronic control device.

DESCRIPTION OF EMBODIMENTS

Hereinafter, embodiments of the present invention will be described with reference to the drawings.

Figure 1:
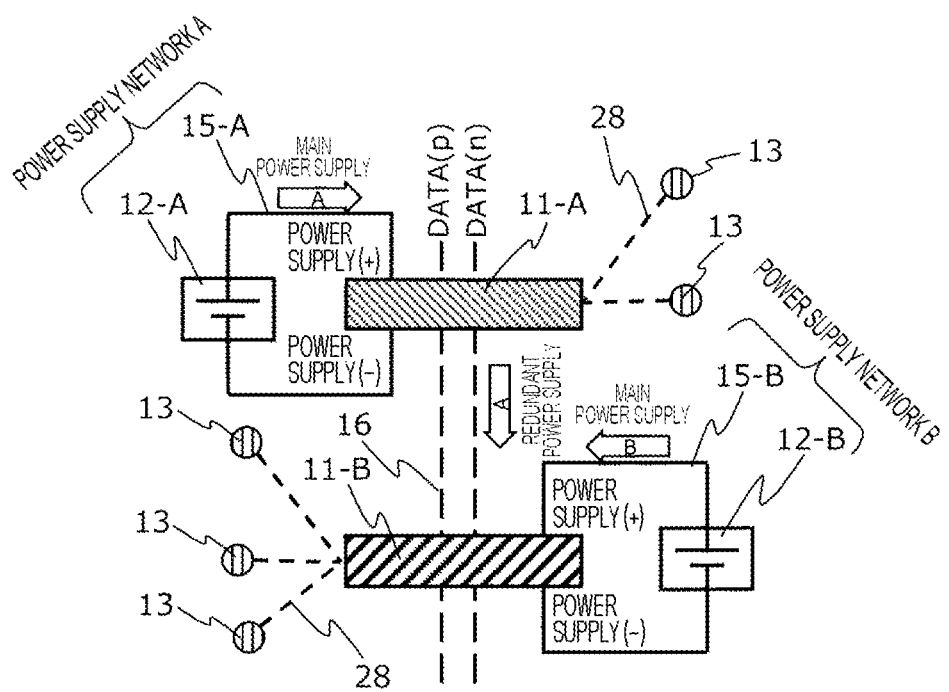
FIG. 1 is a diagram illustrating a connection configuration of an electronic control device according to an embodiment of the present invention.

First, a concept of connection of an electronic control device in each embodiment of the present invention will be described with reference to FIG. 1. FIG. 1 is a connection configuration diagram of an electronic control device 11-A and an electronic control device 11-B to which power superimposition as a basis according to each embodiment is applied. In the present embodiment, a redundant power is transmitted from the electronic control device 11-A to the electronic control device 11-B. Note that the electronic control device 11-A uses the main power supply A fed from a power supply network A as a redundant power supply A. In addition, the electronic control device 11-B uses the main power supply B fed from a power supply network B as the main power supply B.

In addition, the present embodiment indicates a case where power is normally fed from the power supply network A or the power supply network B.

Details thereof will be described below. Independent power storage units 12-A and 12-B feed the main power to the electronic control devices 11-A and 11-B to which a power superimposition data wiring 16 is connected. Normally, the electronic control device 11-A operates with the main power fed from the power supply network A configured by the power storage unit 12-A and a power supply wiring 15-A. In addition, the electronic control device 11-B operates with the main power fed from the power supply network B configured by the power storage unit 12-B and a power supply wiring 15-B. Here, when power feeding is stopped due to a failure or the like of the power supply network B, the function of the electronic control device 11-B is stopped.

Therefore, in order to continuously operate the electronic control device 11-B, the redundant power is superimposed on the power superimposition data wiring 16 and transmitted from the electronic control device 11-A that has received power fed from the power supply network A. As a result, the electronic control device 11-B performs a normal operation while avoiding a functional stop.

Next, a voltage waveform in the above-described operation will be described with reference to FIG. 17. FIG. 17(a) illustrates a waveform of the power superimposition data wiring 16 on which the power is superimposed. The waveform is a waveform in which, in addition to data of DATA(p) and DATA(n), an average voltage difference between the two pieces of data is a drive voltage of the electronic control device 11-B. FIG. 17(b) illustrates waveform examples of power supply wirings 15-A and 15-B. The main power supply is the main power supply A, and an average voltage difference between the power supply (+) and the power supply (−) is the drive voltage of the electronic control device 11.

Figure 17:
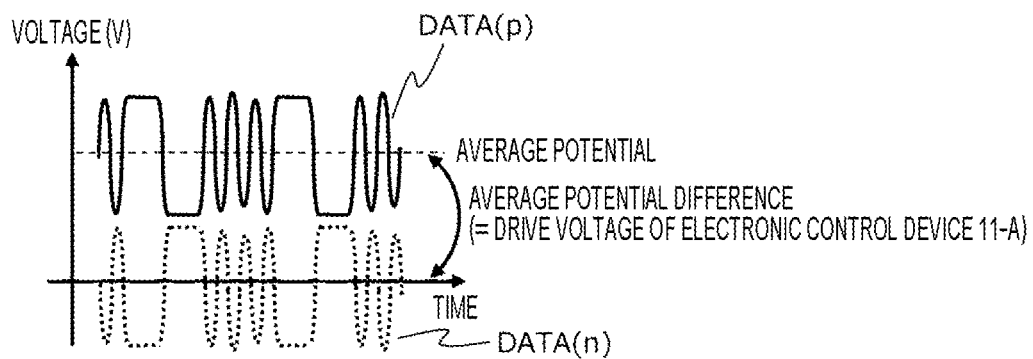
FIG. 17 is a diagram illustrating voltage waveforms of a data wiring and a power supply wiring in the embodiment of the present invention.
Figure 17:
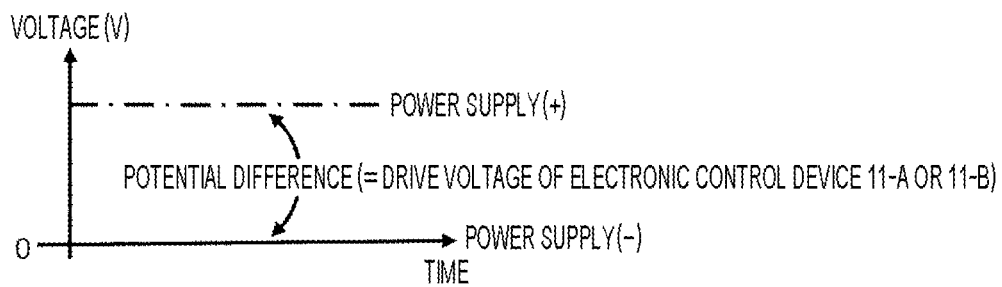

As described above, in each embodiment of the present invention, the power of the voltage waveform illustrated in FIG. 17 is used as the main power, and the main power supply of another electronic control device is used as the redundant power supply.

First to sixth embodiments will be described below.

In the following description, the supply of power from the power supply network is expressed as power supply. In addition, the supply of power from the electronic control device to another electronic control device is expressed as power transmission. Further, reception of power supply is expressed as reception of power.

First Embodiment

First, a network system to which unidirectional power supply superimposition is applied in a first embodiment of the present invention will be described.

Figure 2:
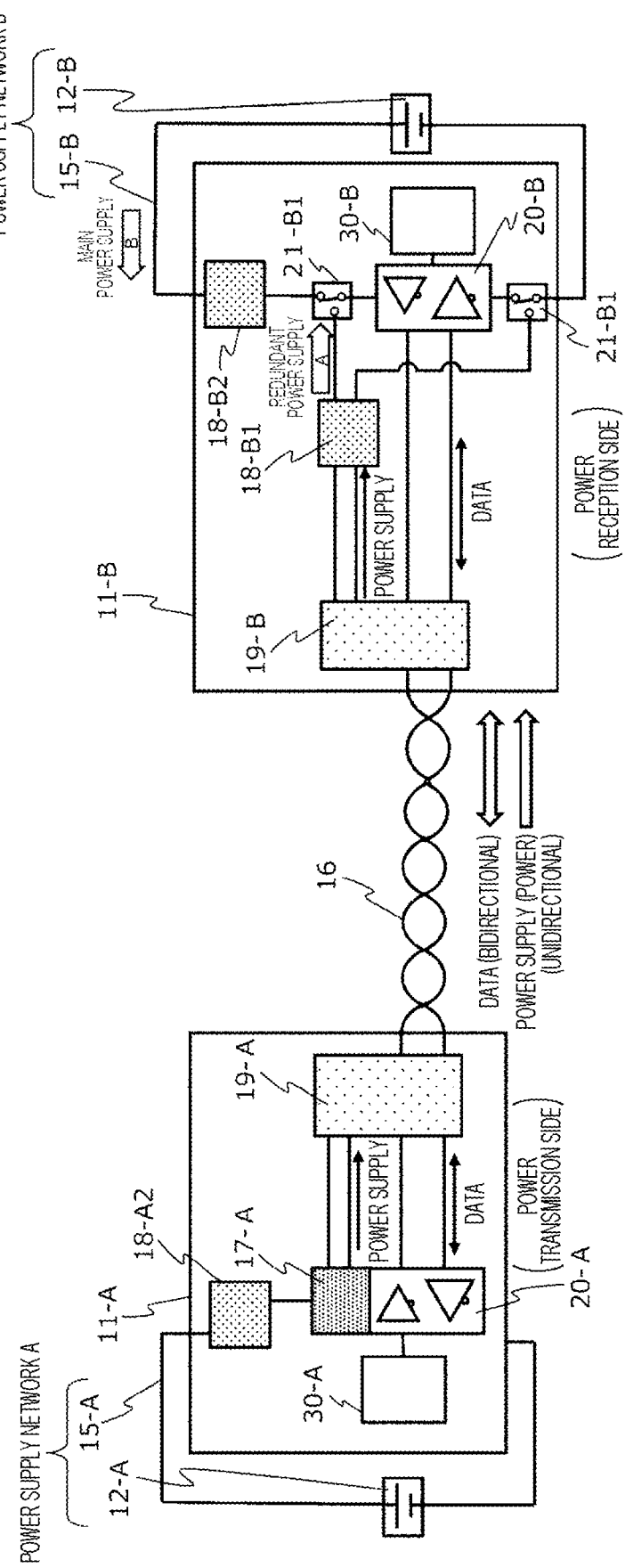
FIG. 2 is a configuration diagram of an electronic control device to which unidirectional power supply superimposition in a first embodiment of the present invention is applied.

FIG. 2 illustrates a configuration of an electronic control device in the network system of the present embodiment. Since large-capacity data communication such as camera data is included between the electronic control devices 11 of the present system, a high-frequency cable such as an impedance-designed coaxial or differential pair is used. The high-frequency cable is basically and physically two wirings, and a power supply (+) and a power supply (−) are superimposed on the respective two wirings. In particular, in order to reduce the number of cables in a vehicle, bidirectional data communication is performed by a pair of paired cables such as an unshielded twist pair (UTP), a shielded twist pair (STP), and a shielded parallel pair (SPP). On the other hand, a power supply that can be superimposed by a pair of paired cables is unidirectional. Therefore, in the present embodiment, power can be transmitted only from the electronic control device 11-A having a power transmission function to the electronic control device 11-B having a power reception function.

The electronic control device 11-A on the power transmission side includes a data transmission and reception device 20-A that transmits and receives at least data, a power transmission device 17-A that fees power, a power reception device 18-A2 that receives power from the power supply network A, a filter device 19-A, and a CPU 30-A. The main power is fed from the power supply network A to the power reception device 18-A2. In addition, transmission/reception data generated by the data transmission and reception device 20-A and the power of the power transmission device 17-A are combined by using the filter device 19-A. Then, the filter device 19-A transmits data and redundant power to the electronic control device 11-B on the power reception side via the power superimposition data wiring 16. As described above, the filter device 19-A functions as a data wiring connection device connected to the power superimposition data wiring 16.

In addition, the CPU 30-A performs calculation for control performed by the electronic control device 11-A. Data for this purpose is input or output through the data transmission and reception device 20-A. Further, the CPU 30-A is driven by using the power received by the power reception device 18-A2. Furthermore, the data transmission and reception device 20-A may be configured as a portion of the CPU 30-A.

The electronic control device 11-B on the power reception side includes a data transmission and reception device 20-B, the power reception device 18-A2, a power reception device 18-B2, a filter device 19-B, power selection switches 21-B1 and 21-B2, and a CPU 30-B. The main power is fed from the power supply network B.

In addition, the filter device 19-B separates the data and the power, which have been transmitted from the power superimposition data wiring 16 from each other, and transmits the data to the data transmission and reception device 20-B and transmits the power to a power reception device 18-B1. Further, when the power supply network B fails, the CPU 30-B controls the power selection switches 21-B1 and 21-B2 to switch the operation power supply from the main power supply to the redundant power supply and then operate.

In the present embodiment, the configurations of the electronic control device 11-A and the electronic control device 11-B are partially different, but may be common. In this case, the electronic control device 11-A is provided with the power reception device 18-A1 and power selection switches 21-A1 and 21-A2. In addition, the electronic control device 11-B is provided with a power transmission device 17-B.

Furthermore, the electronic control devices 11-A and 11-B are connected to the power supply networks A and B that supply power, respectively. Here, the power supply network A is configured by the power storage unit 12-A and the power supply wiring 15-A. In addition, the power supply network B is configured by the power storage unit 12-B and the power supply wiring 15-B. Here, the power storage units 12-A and 12-B only need to be able to supply power by some means. For example, the power storage units 12-A and 12-B can be realized by on-vehicle batteries. Further, the power storage units 12-A and 12-B may be realized by so-called secondary batteries or generators for driving the vehicle. The generator also includes an alternator. A method of realizing the power storage units 12-A and 12-B will be described later, or the method in each embodiment is similar to the method in the present embodiment.

Figure 3:
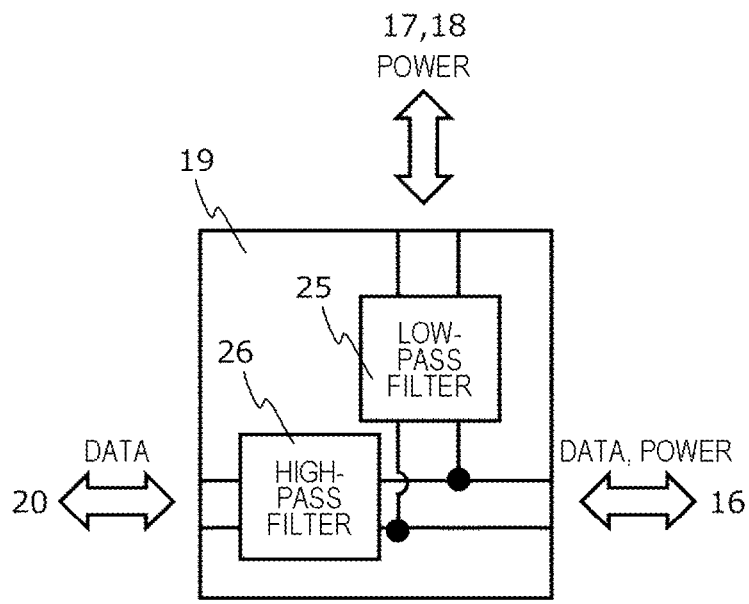
FIG. 3 is a configuration diagram of a filter device in the first embodiment of the present invention.

Next, FIG. 3 illustrates the configuration of the filter device 19. Since the data and the power supply have different frequency components, separation and combination are performed by filters having different frequency characteristics. The filter device 19-A and the filter device 19-B may have the same configuration.

The configuration of the filter device 19 will be described below, but branch numbers (-A and the like) of the reference signs described below will be omitted. This is because the filter device 19 and the other components are realized by the same configuration on the power transmission side and the power reception side.

A high-pass filter 26 is provided between the data transmission and reception device 20 and the power superimposition data wiring 16. The high-pass filter 26 is realized by capacitors and the like arranged in series. Therefore, the high-pass filter 26 can pass only data in a high frequency band without passing a signal such as power in a low frequency band.

Furthermore, a low-pass filter 25 is provided between the power transmission device 17-A and the power reception device 18, and the power superimposition data wiring 16. The low-pass filter 25 is realized by arranging coils and ferrite beads in series. Therefore, the low-pass filter 25 can pass a signal such as power in the low frequency band and cannot pass data in the high frequency band.

By using the filter device 19 having the above configuration, the electronic control device 11-A can combine data and power. That is, the filter device 19-A combines the power having passed through the low-pass filter 25 and the data having passed through the high-pass filter 26, and outputs the combination to the power superimposition data wiring 16. In addition, the filter device 19-B separates the power and data superimposed from the power superimposition data wiring 16 into the power having passed through the low-pass filter 25 and the data having passed through the high-pass filter 26. Then, the filter device 19-B outputs the separated power to the power reception device 18-B1. Further, in the filter device 19-B, as in this configuration in which the separated data is output to the data transmission and reception device 20-B, by connecting the electronic control devices 11 to each other with the power superimposition data wiring 16 in which the power is superimposed on the data, it is possible to realize redundancy of the power supply with a small number of wirings. Therefore, it is possible to construct a highly-reliable network with a simple configuration.

Further, as illustrated in FIG. 1, the sensor 13 such as a camera that monitors the surroundings may be connected to each electronic control device 11 via a sensor data wiring 28. By superimposing a power on the sensor data wiring 28, it is possible to further reduce the number of wirings.

Here, in the present embodiment, the total number of power supply wirings is two, that is, the power supply wiring 15-A and the power supply wiring 15-B with respect to the electronic control devices 11-A and 11-B. Note that the described number indicates the total number of power supply wirings respectively connected to the electronic control devices. At this time, in a case where even power supply wiring from the same power storage unit is connected to a plurality of electronic control devices, the total number indicates the number of electronic control devices to be connected.

On the other hand, the total number of power supply wirings of the system using the conventional redundant power supply is four. In this case, two power supply wirings from the power storage units 12-A and 12-B are connected to the electronic control devices 11-A and 11-B, respectively. Therefore, the number of wirings to which power is supplied is four in 2×2.

To summarize the above description, in the conventional system, the number of wirings through which power is fed or transmitted is indicated by the number of electronic control devices×redundant multiplexing. In the present embodiment, since there are two power supplies, the multiplexing means duplexing.

On the other hand, in the network system illustrated in the connection configuration between the electronic control devices in FIG. 2, the number of wirings can be provided as follows.

$$2n > N \geq n$$

Here, N is the total number of power supply wirings, and n is the number of electronic control devices. Note that 2 of 2n is a value corresponding to the multiplexing. An example of the multiplexing includes the number of power storage units.

As described above, in the present embodiment, it is possible to reduce the total number of power supply wirings as compared with the related art.

Second Embodiment

Next, as a second embodiment of the present invention, a zone architecture configuration of an on-vehicle network to which the power superimposition data wiring is applied will be described.

Figure 4:
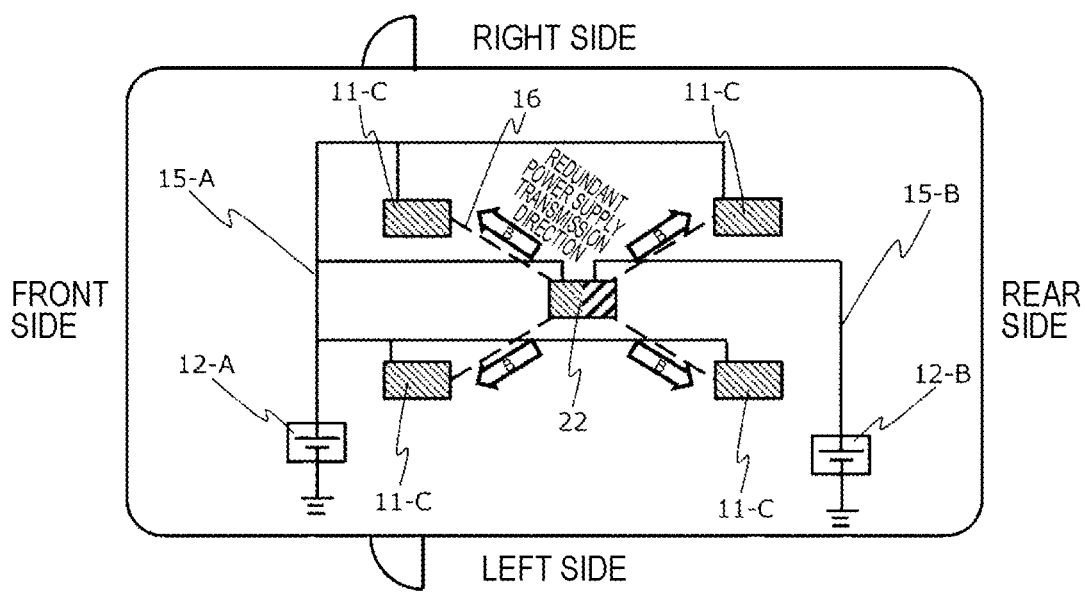
FIG. 4 is a configuration diagram of a star-type on-vehicle backbone network system in a second embodiment of the present invention.

FIG. 4 illustrates a configuration diagram of a star-type on-vehicle backburn network system in the present embodiment.

There are roughly two types of electronic control devices: an integrated electronic control device 22 and an area electronic control device 11-C. The integrated electronic control device 22 analyzes data from information of the sensor 13 that monitors the surroundings of the vehicle, and determines the action and control of the vehicle. The area electronic control device 11-C is connected to the limited number of input and output ports of the integrated electronic control device 22. Therefore, aggregation of a plurality of pieces of sensor data and speed conversion from a several Mbps data rate such as a CAN to a high speed communication data rate of the Gbps class of the backbone network are performed. In addition, there is no problem even if some area electronic control devices 11-C serve as the integrated electronic control device 22. Furthermore, the integrated electronic control device 22 has a configuration similar to that of the electronic control device 11-A illustrated in FIG. 2. In addition, the area electronic control device 11-C has a configuration similar to that of the electronic control device 11-B illustrated in FIG. 1. This configuration is similar in other embodiments described later.

In the network system illustrated in the present embodiment, the area electronic control devices 11-C are arranged in four areas of the front right, the front left, the rear right, and the rear left in FIG. 4. In addition, the integrated electronic control device 22 is disposed at the center in FIG. 4. This is because each area electronic control device 11-C is disposed near the on-vehicle sensor 13 and collects the sensor data. Then, each area electronic control device 11-C transmits the sensor data to the integrated electronic control device 22 via the power superimposition data wiring 16. Since the arrangement of the power superimposition data wiring 16, the area electronic control device 11-C, and the integrated electronic control device 22 is similar to a star shape, the network system illustrated in FIG. 2 has a star-type network configuration.

In addition, since the integrated electronic control device 22 requires large-scale arithmetic processing such as data analysis and travel control, it is desirable to use a highly functional large-scale integration (LSI), system-on-chip (SoC), or the like as the CPU 30-A. Therefore, the power consumption of the integrated electronic control device 22 increases. Thus, the power storage units 12-A and 12-B feed power to the integrated electronic control device 22 both from the main power supply and the redundant power supply via the power supply wirings 15-A and 15-B.

On the other hand, in the area electronic control device 11-C, the scale of functions and arithmetic processing is smaller than that of the integrated electronic control device 22, and power consumption is low. Therefore, the power storage unit 12-A feeds the main power to the area electronic control device 11-C via the power supply wiring 15-A. In addition, the integrated electronic control device 22 transmits power fed from the power storage unit 12-B via the power superimposition data wiring 16 as the redundant power.

In this configuration, the power supply wiring 15-B of the power storage unit 12-B is only the wiring to the integrated electronic control device 22, and thus it is possible to reduce the power supply network to the entirety of the vehicle. Therefore, it is possible to realize power supply redundancy by adding a smaller number of wirings, to reduce the weight of the wire harness, and to construct a highly reliable on-vehicle network system.

Here, as in the first embodiment, the total number of power supply wirings for each electronic control device is checked. In the present embodiment, one power supply wiring 15-A is connected to each area electronic control device 11-C. Here, in the present embodiment, since four area electronic control devices 11-C are provided, the total number is four. In addition, two power supply wirings 15-A and 15-B are connected to the integrated electronic control device 22. Therefore, the total number of power supply wirings in the present embodiment is six.

On the other hand, the total number of power supply wirings in the on-vehicle system using the conventional redundant power supply is 10 in 5×2. As described above, also in the present embodiment, the relationship of 2n>N n is satisfied.

Third Embodiment

Next, as a third embodiment, an on-vehicle network system in which the installation position of the power storage unit of the main power supply is changed in accordance with the installation position of the area electronic control device will be described. The third embodiment is a modification example of the second embodiment. In the second embodiment, the power storage unit 12-A of the main power supply for each area electronic control device 11-C is provided. The main power supply for each of the area electronic control devices 11-C and 11-D in the third embodiment is divided into the power storage unit 12-A and the power storage unit 12-B. Note that the area electronic control device 11-D has a configuration similar to that of the area electronic control device 11-D, but the branch number of the reference sign is changed depending on the installation position. The same applies to each embodiment described later.

Figure 5:
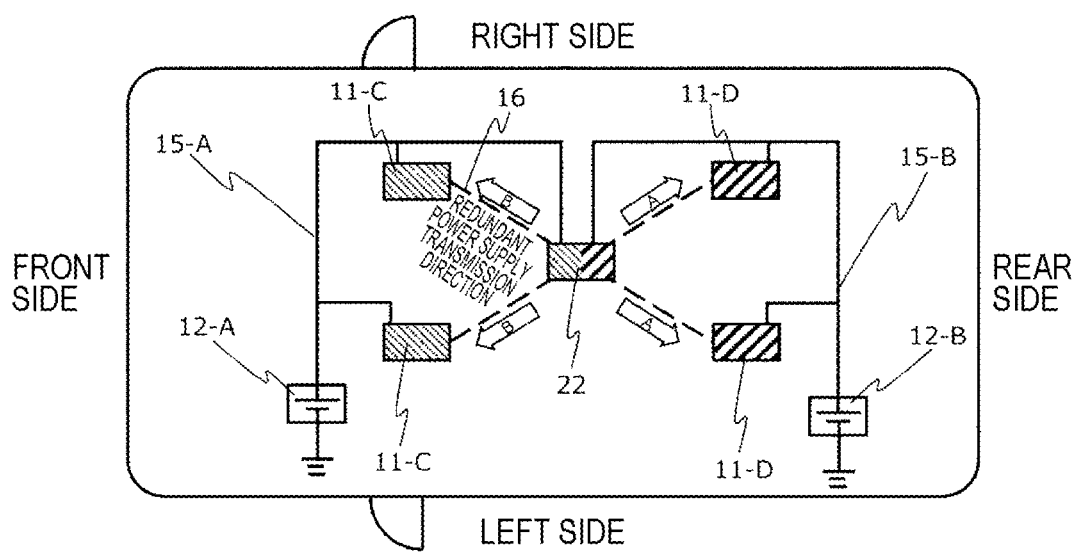
FIG. 5 is a configuration diagram of a star-type on-vehicle backbone network system (power supply arrangement change) in a third embodiment of the present invention.

FIG. 5 illustrates a configuration diagram of an on-vehicle backbone network system according to the present embodiment. Generally, a vehicle including an automobile is a rectangular parallelepiped having a longer length in the front-rear direction than in the left-right direction in a traveling direction. Therefore, when the main power supply is wired only with one power storage unit 12-A as in the second embodiment, the wiring in the front-rear direction becomes long. In addition, when the main power supply is wired only by one power storage unit 12-A as in the second embodiment, there is a possibility that all the power storage units 12 are broken due to a collision in front. Therefore, regarding the power storage unit 12 in the present embodiment, one power storage unit 12 (12-A) is disposed on the front side and one power storage unit 12 (12-B) is disposed on the rear side so that all the power storage units 12 are not broken due to a collision in front of the vehicle or a collision in rear of the vehicle.

That is, as described above, in the present embodiment, the power storage unit 12-A disposed on the front side feeds power as the main power supply of the area electronic control device 11-C on the front side. In addition, the power storage unit 12-B disposed on the rear side feeds power as the main power supply of the area electronic control device 11-D on the rear side. Further, the integrated electronic control device 22 transmits power as a redundant power supply of each of the area electronic control devices 11-C and 11-D. More specifically, the integrated electronic control device 22 transmits the power fed from the power storage unit 12-B to the area electronic control device 11-C via the power superimposition data wiring 16. In addition, the integrated electronic control device 22 transmits the power fed from the power storage unit 12-A to the area electronic control device 11-D via the power superimposition data wiring 16. Therefore, in the present embodiment, it is possible to reduce the cable wiring in the front-rear direction, and to reduce the weight of the wire harness.

However, as a further modification example of the present embodiment, the arrangement of the main power supply and the superimposition power supply may be reversed. That is, the power storage unit 12-A feeds power as the main power supply of the area electronic control device 11-D. In addition, the power storage unit 12-B feeds power as the main power supply of the area electronic control device 11-C. Furthermore, in this case, the power storage unit 12 of the power supply source of the redundant power transmitted from the integrated electronic control device 22 is also reversed.

In the configuration of the third embodiment illustrated in FIG. 5 as described above, the total number of power supply wirings is similar to that in the second embodiment. That is, the total number of power supply wirings in the third embodiment is six. In addition, the total number of power supply wirings in the on-vehicle system using the conventional redundant power supply is 10, similarly to the second embodiment. As described above, the relationship of 2n>N≥n is also satisfied in the third embodiment.

Figure 6:
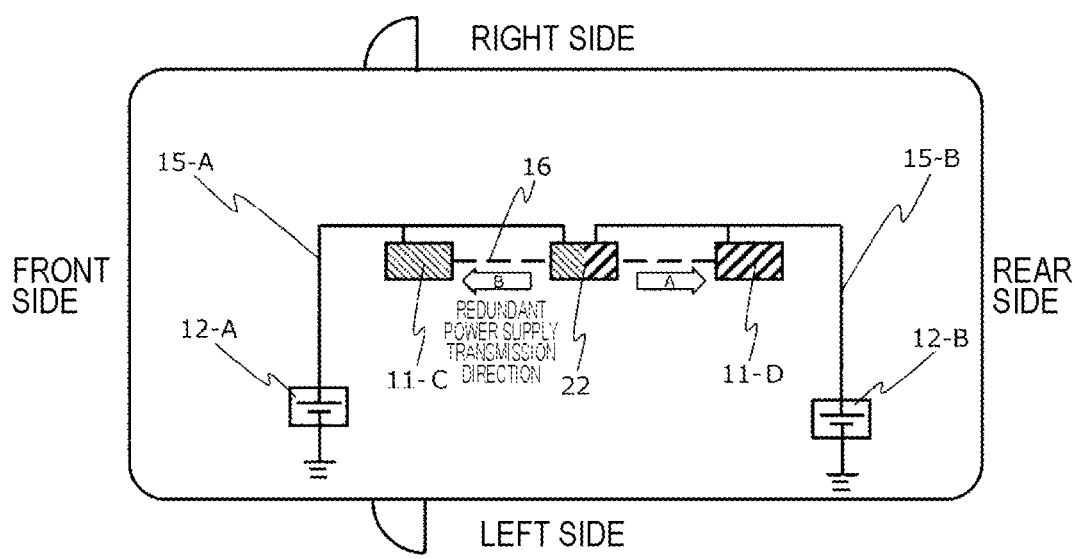
FIG. 6 is a configuration diagram of a star-type on-vehicle backbone network system in a modification example of the third embodiment of the present invention.

Here, a further modification example of the third embodiment will be described with reference to FIG. 6. FIG. 6 illustrates a configuration diagram of an on-vehicle network system according to the present modification example. The power supply wirings 15-A and 15-B and the power superimposition data wiring 16 are required as many as the area electronic control devices 11-C and 11-D. That is, as the number of the area electronic control devices 11-C and 11-D increases, the number of wirings increases. Therefore, in the present modification example, each one area electronic control device 11-C is collectively disposed on the front side and each one area electronic control device 11-C is collectively disposed on the rear side. Even in this case, the main power supply and the redundant power supply can be configured similarly to FIG. 5, and thus it is possible to expect significant reduction in the weight of the wire harness. The total number of power supply wirings in the on-vehicle system in the present modification example is four. In addition, the total number of power supply wirings in the on-vehicle system using the conventional redundant power supply is 6. As described above, in the present modification example, the relationship of 2n>N≥n is also satisfied.

As described above, in the third embodiment including the modification example, the main power supply to which power is fed is changed depending on the arrangement position of each of the area electronic control devices 11-C and 11-D. Thus, it is possible to shorten the lengths of the power supply wirings 15-A and 15-B and to reduce the weight of the wire harness.

Note that the area electronic control devices 11-C and 11-D in the third embodiment are similar to the area electronic control device 11-C in the second embodiment.

Fourth Embodiment

Next, a ring-type on-vehicle network system will be described as a fourth embodiment. In the present embodiment, data can also be made redundant.

Figure 7:
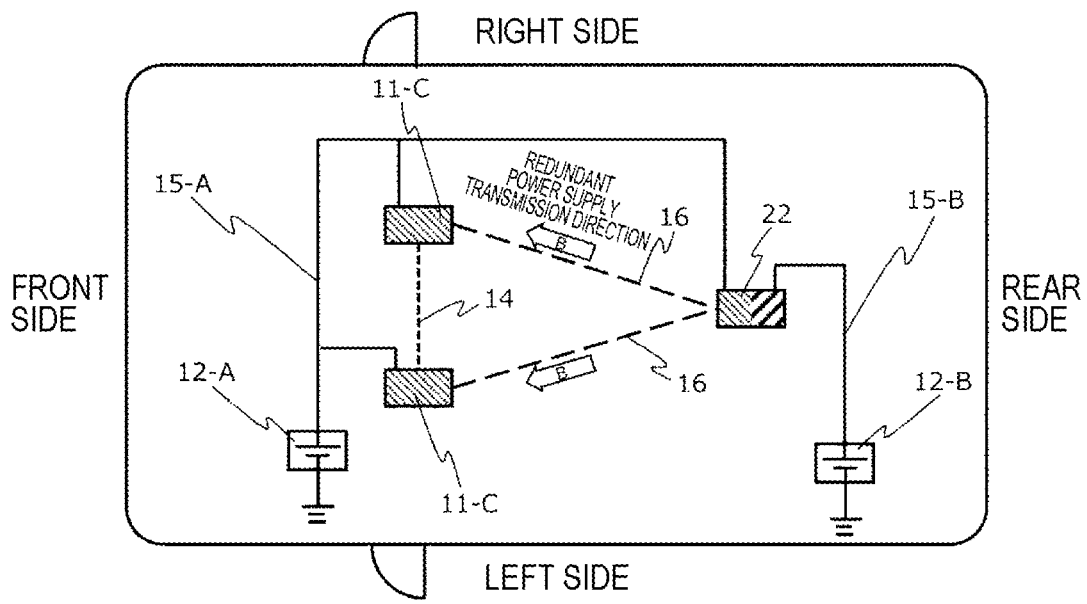
FIG. 7 is a configuration diagram of a ring-type on-vehicle backbone network system (data redundancy) in a fourth embodiment of the present invention.

FIG. 7 illustrates a configuration diagram of an on-vehicle backbone network system according to the present embodiment. The vehicle travels forward from a general road to an expressway or the like at a speed of several km/h to 100 km/h or faster. Therefore, forward monitoring requires monitoring in a wide range from a short distance of several meters to a long distance of 200 m or more. On the other hand, since the vehicle does not travel backward at a high speed, the rear monitoring may be monitoring at a relatively short distance.

Therefore, the number of sensors that monitor the rear is smaller than the number of sensors that monitor the front. Therefore, the functions of the rear area electronic control device 11-D are integrated into the integrated electronic control device 22. Thus, the installation of the area electronic control devices 11-D in the second and third embodiments can be omitted. In this configuration, both the power storage units 12-A and 12-B feed power to the integrated electronic control device 22. In addition, the power storage unit 12-A disposed in front of the vehicle feeds power as the main power supply of the area electronic control device 11-C. In addition, the integrated electronic control device transmits power fed from the power storage unit 12-B as the redundant power supply, via the power superimposition data wiring 16.

Further, the area electronic control devices 11-C are connected to each other by the data wiring 14. As described above, by configuring the network in a ring, two independent data communication paths can be secured from each area electronic control device 11-C to the integrated electronic control device 22. Therefore, even if some network wiring fails, it is possible to transmit the data of the area electronic control device 11-C to the integrated electronic control device 22, and to make data communication redundant. That is, it is possible to realize redundancy of both the power supply and the data communication, and to construct a more reliable on-vehicle network.

Regarding the data wiring 14 between the area electronic control devices 11-C, the redundancy of the power supply has already been secured, and thus there is no problem even though the power is not superimposed.

As a modification example of the present embodiment, a configuration in which the functions of the area electronic control device 11-C are integrated into the integrated electronic control device 22, and the area electronic control device 11-D is left may be made. Further, one area electronic control device may be integrated into the integrated electronic control device by dividing the area into the front and rear sides, the right and left sides, and the upper and lower sides.

In addition, the total number (total number) of power supply wirings in the present embodiment is four. On the other hand, the total number of power supply wirings in the on-vehicle system using the conventional redundant power supply is 6 in 3×2. As described above, also in the present embodiment, the relationship of 2n>N≥n is satisfied.

Fifth Embodiment

Figure 8:
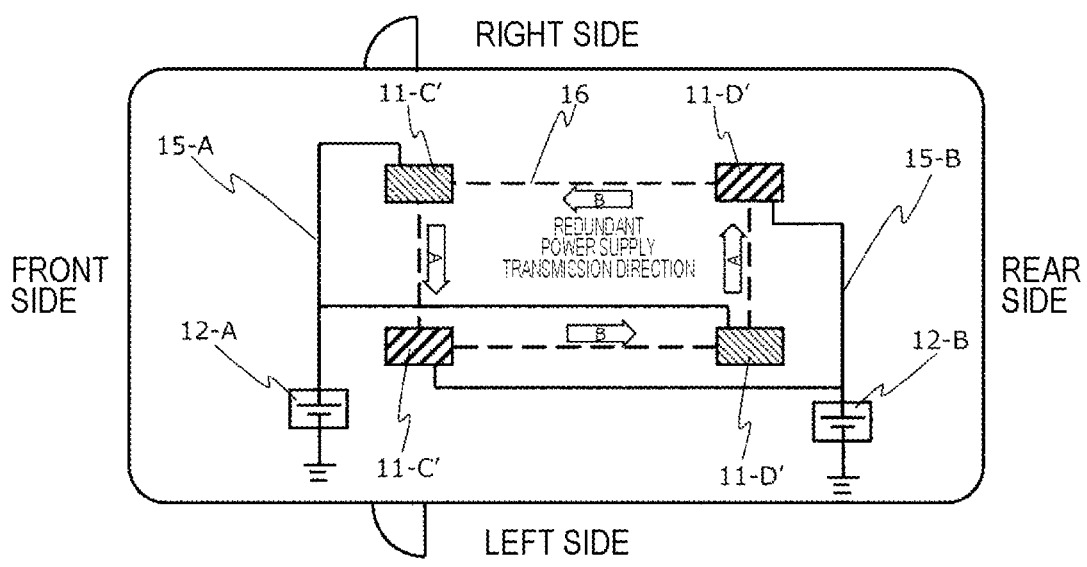
FIG. 8 is a configuration diagram of a ring-type on-vehicle backbone network system (staggered arrangement) in a fifth embodiment of the present invention.

Next, as a fifth embodiment, a ring-type on-vehicle backbone network system that feeds power to the main power supply of the electronic control device 11 in a staggered arrangement will be described. FIG. 8 illustrates a configuration diagram of the present embodiment. In the present embodiment, a vehicle is divided into four areas of front right, front left, rear right, and rear left, and area electronic control devices 11-C' and 11-D' are arranged. Then, the functions of the integrated electronic control device 22 are divided and distributed to the area electronic control devices 11-C' and 11-D'.

Figure 18:
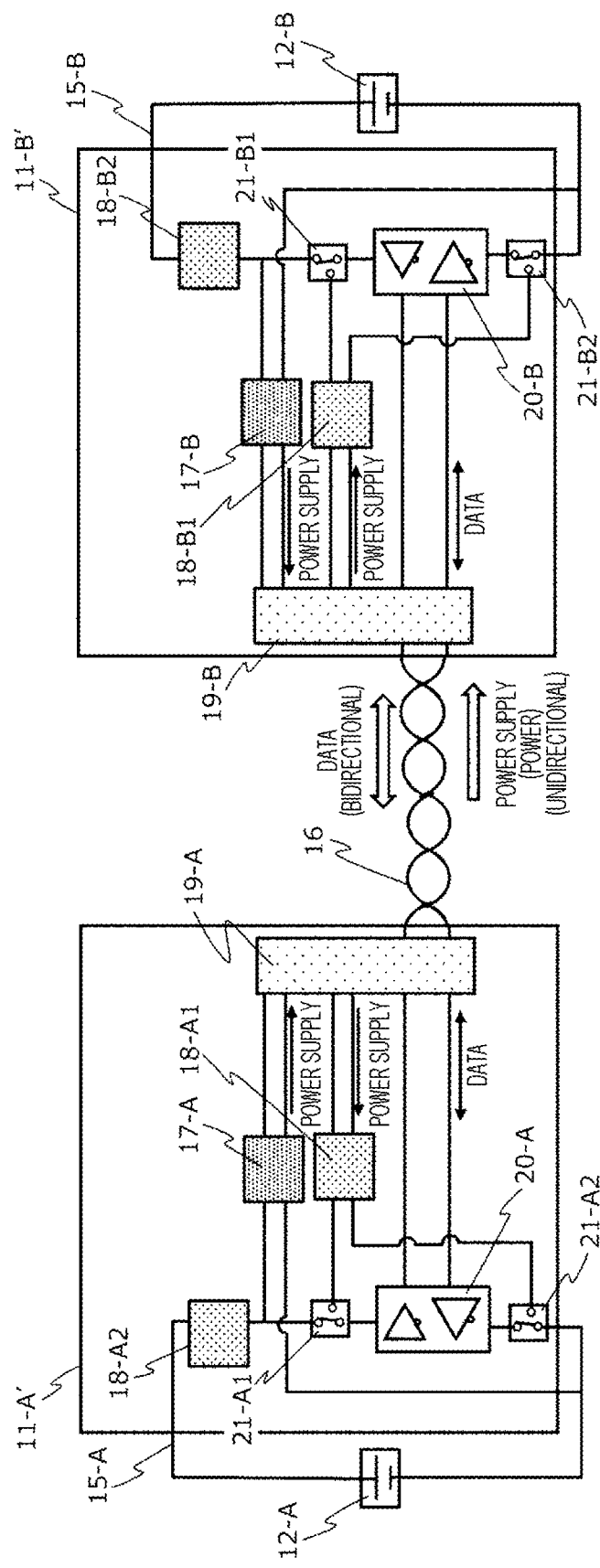
FIG. 18 is a configuration diagram of an area electronic control device in the fifth embodiment of the present invention.

Here, electronic control devices 11-A' and 11-B' used as the area electronic control devices 11-C' and 11-D' will be described with reference to FIG. 18. As illustrated in FIG. 18, the structure of the electronic control device 11-A' further includes a power reception device 18-A1 and power selection switches 21-A1 and 21-A2 as compared with the electronic control device 11-A illustrated in FIG. 2. In addition, the structure of the electronic control device 11-B' further includes a power transmission device 17-B as compared with the electronic control device 11-B. That is, the electronic control device 11-A' and the electronic control device 11-B' have a similar configuration, and the branch numbers of the reference signs are changed in accordance with the power storage unit used as the main power supply. Note that, in FIG. 18, power being the redundant power is transmitted from the electronic control device 11-A' to the electronic control device 11-B', but the direction may be opposite as illustrated in FIG. 8. In addition, in FIG. 18, descriptions of the CPUs 18-A and 18-B are omitted.

Here, the description returns to FIG. 8. In the ring-type on-vehicle backbone network system in FIG. 8, the electronic control devices 11-A' and 11-B' are used as the area electronic control devices 11-C' and 11-D', respectively. Note that, among the area electronic control devices, the area electronic control devices arranged on the front right and the rear left are referred to as the area electronic control devices 11-C', and the area electronic control devices arranged on the front left and the rear right are referred to as the area electronic control devices 11-D'. Here, the power storage unit 12-A feeds power to the area electronic control device 11-C' as the main power supply. In addition, the power storage unit 12-B feeds power to the area electronic control device 11-D' as the main power supply. As described above, in the present embodiment, the area electronic control devices 11-C' and 11-D' having different main power supplies are arranged in a staggered arrangement, and the power superimposition data wiring 16 constitutes a ring-type network.

As a result, in the backbone network, the area electronic control device 11-C'→the area electronic control device 11-D'→the area electronic control device 11-C', . . . , and the area electronic control devices 11-C' and 11-D' having different main power supplies are sequentially arranged. In this network configuration, by aligning the power transmission direction of the redundant power supply rightward or leftward, each of the area electronic control devices 11-C' and 11-D' can receive the redundant power. That is, the area electronic control device 11-C' transmits the power fed from the power storage unit 12-A to the area electronic control device 11-D' as the redundant power supply. In addition, the area electronic control device 11-D' transmits the power fed from the power storage unit 12-B to the area electronic control device 11-C' as the redundant power supply.

Since this configuration is a ring-type network configuration, data can be transmitted through two paths of rightward and leftward, and even if any power superimposition data wiring 16 fails, a highly reliable on-vehicle network in which data redundancy is secured is obtained.

In addition, in the present embodiment, an example in which the power storage unit 12-A feeds power to the area electronic control devices 11-C' on the front right and the rear left, and the power storage unit 12-B feeds power to the area electronic control devices 11-D' on the front left and the rear right has been described. However, even though the combination of the power storage units 12-A and 12-B and the area electronic control devices 11-C' and 11-D' is different, the similar function is exhibited.

In addition, the total number (total number) of power supply wirings in the present embodiment is four. On the other hand, the total number of power supply wirings in the on-vehicle system using the conventional redundant power supply is 8 in 4×2. As described above, also in the present embodiment, the relationship of 2>n≥N n is satisfied.

Sixth Embodiment

Next, a sixth embodiment will be described. In the sixth embodiment, bidirectionality of power fed or transmitted is achieved. That is, the power feeding and power transmission directions of the main power supply and the redundant power supply are bidirectional. In general, in an on-vehicle network (FIG. 2), data communication is performed bidirectionally by one of paired cables. Therefore, power supply and power transmission by power superposition are unidirectional. However, during actual use, it is unknown which of the main power supply and the redundant power supply fails due to circumstances. Therefore, in the unidirectional power feeding or power transmission, it is necessary to secure redundancy in the entirety of the system in which a plurality of area electronic control devices are combined, but this becomes complicated. Therefore, there is provided a configuration that helps even if any power supply network fails.

Figure 9:
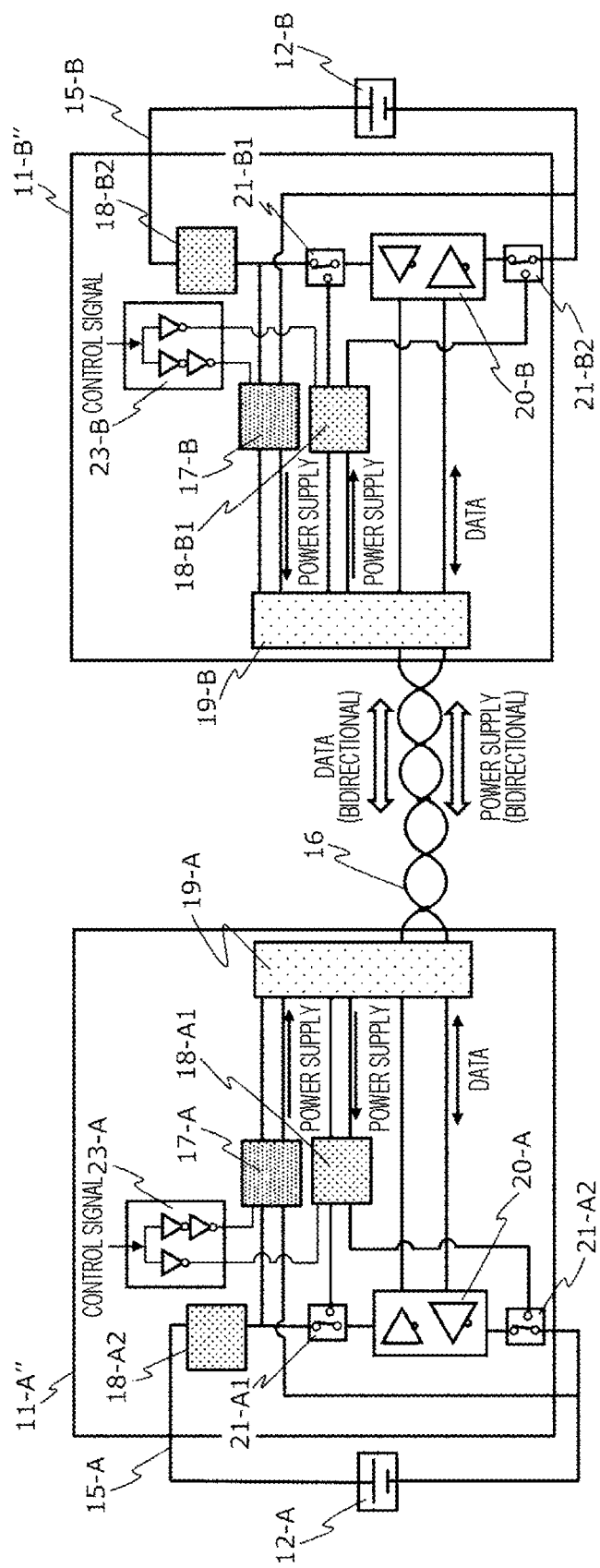
FIG. 9 is a configuration diagram of an electronic control device to which bidirectional power supply superimposition in a sixth embodiment of the present invention is applied.

FIG. 9 illustrates configurations of electronic control devices 11-A" and 11-B" according to the present embodiment. The configurations are partially common to the area electronic control device in the fifth embodiment illustrated in FIG. 18, and are different in the following points in order to realize bidirectional power supply. The electronic control devices 11-A" and 11-B" further include driving control devices 23-A and 23-B, respectively. The other portions are similar to the electronic control devices 11-A' and 11-B'. The electronic control devices 11-A" and 11-B" have the same configuration. Note that, also in FIG. 9, descriptions of the CPUs 18-A and 18-B are omitted.

Here, in order to make the power supply redundant, it is necessary for the main power supply and the redundant power supply to feed power from different power storage units 12. Therefore, data and power can be transmitted and received bidirectionally via the power superimposition data wiring 16 between the electronic control device 11-A" using the power storage unit 12-A as the main power supply and the electronic control device 11-B" using the power storage unit 12-B as the main power supply. Therefore, both the power transmission devices 17-A and 17-B and the power reception devices 18-A1, 18-A2, 18-B1, and 18-B2 are provided in the electronic control devices 11-A" and 11-B". Then, the data and the power are coupled in the power superimposition data wiring 16 through the filter devices 19-A and 19-B. Regarding power transmission and reception, the driving control device 23-A is provided so that the power reception device 18-A1 and the power reception device 18-A2 operate exclusively. Further, the driving control device 23-B is provided so that the power reception device 18-B1 and the power reception device 18-B2 operate exclusively. By adding this configuration, the electronic control device 11 can be changed to both the power transmission side and the power reception side, and the redundant power can be bidirectionally transmitted between the electronic control device 11-A" and the electronic control device 11-B".

Figure 10:
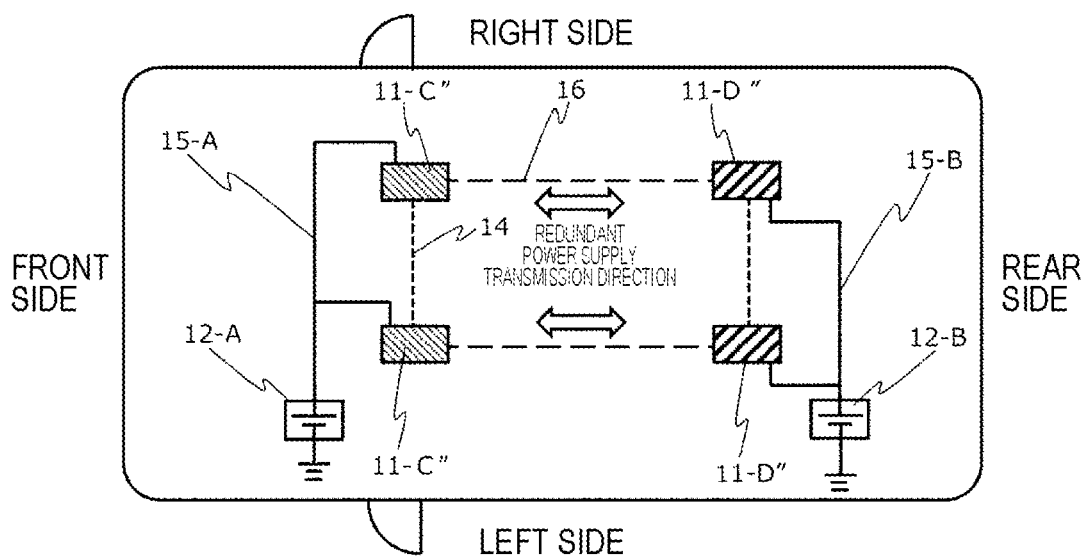
FIG. 10 is a configuration diagram of an on-vehicle backbone network system (front-rear direction) using the electronic control device in the sixth embodiment of the present invention.

FIG. 10 illustrates a configuration of an on-vehicle backbone network system (front-rear direction) using the area electronic control devices 11-C" and 11-D" in the present embodiment. This configuration adopts a configuration similar to that of the ring-type on-vehicle backbone network system in the fifth embodiment illustrated in FIG. 8. That is, it is similar in that a vehicle is divided into four areas of front right, front left, rear right, and rear left, and the area electronic control devices 11-C" and 11-D" are arranged in the respective areas.

However, in addition to the above-described difference in the area electronic control device, the main power supply of each of the area electronic control devices 11-C" and 11-D" is different from those of the area electronic control devices 11-C' and 11-D'. That is, power is fed from the power storage unit 12-A on the front side to the area electronic control device 11-C" disposed on the front side, and power is fed from the power storage unit 12-B on the rear side to the area electronic control device 11-D" disposed on the rear side. At this time, by constructing a network having a ring structure in which at least a portion between the front right side and the rear right side and a portion between the front left side and the rear left side are used as the power superimposition data wirings 16, it is possible to obtain a redundant power supply from a power supply different from the main power supply. Here, in the present application example, the redundant power is transmitted and received in both directions of the "front-rear direction". That is, power is transmitted and received by the area electronic control device 11-C" and the area electronic control device 11-D".

In addition, with this configuration, it is possible to reduce the number or length of the power supply wirings 15-A and 15-B between the front side and the rear side where the cable length becomes long, leading to weight reduction of the wire harness. In addition, the total number (total number) of power supply wirings in the present application example is four. On the other hand, the total number of power supply wirings in the on-vehicle system using the conventional redundant power supply is 8 in 4×2. As described above, also in the present application example, the relationship of 2n>N≥n is satisfied.

Figure 11:
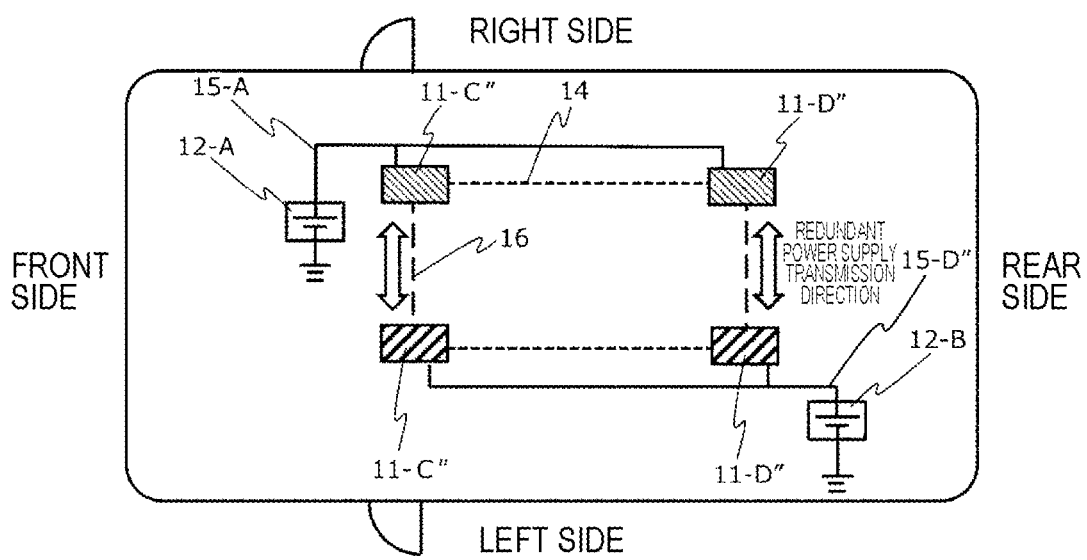
FIG. 11 is a configuration diagram of an on-vehicle backbone network system (left-right direction) using the electronic control device in the sixth embodiment of the present invention.

Next, as another application example of the present embodiment, an on-vehicle backbone network system (left-right direction) that transmits and receives redundant power in both directions of the "left-right direction" will be described. FIG. 11 illustrates a configuration diagram of an on-vehicle backbone network system being the present application. The present application example is different from the application example in FIG. 10 in the arrangement positions of the power supply wirings 15-A and 15-B. That is, the power storage unit 12-A is used as the main power source of the area electronic control device 11-C" and the area electronic control device 11-D" on the right side. In addition, the power storage unit 12-B is used as the main power source of the area electronic control device 11-C" and the area electronic control device 11-D" on the left side. As a result, a network having a ring structure in which at least a portion between the front right side and the front left side and a portion between the rear right side and the rear left side are used as the power superimposition data wirings 16 is constructed. With this configuration, it is possible to construct an on-vehicle network in which the redundant power is fed from a power supply different from the main power supply, and power supply redundancy is ensured. Here, in the present application example, the redundant power is transmitted and received in both directions of the "left-right direction". That is, redundant power is transmitted and received between the area electronic control devices 11-C". Furthermore, redundant power is transmitted and received between the area electronic control devices 11-D".

Note that the total number (total number) of power supply wirings in the present application example is four. On the other hand, the total number of power supply wirings in the on-vehicle system using the conventional redundant power supply is 8 in 4×2. As described above, also in the present application example, the relationship of 2n>N≥n is satisfied.

As described above, as in the application examples illustrated in FIGS. 10 and 11, the effect does not change even though the network configuration is flexibly changed due to the ease of installation of the wiring of the main power supply and the redundant power supply.

Figure 12:
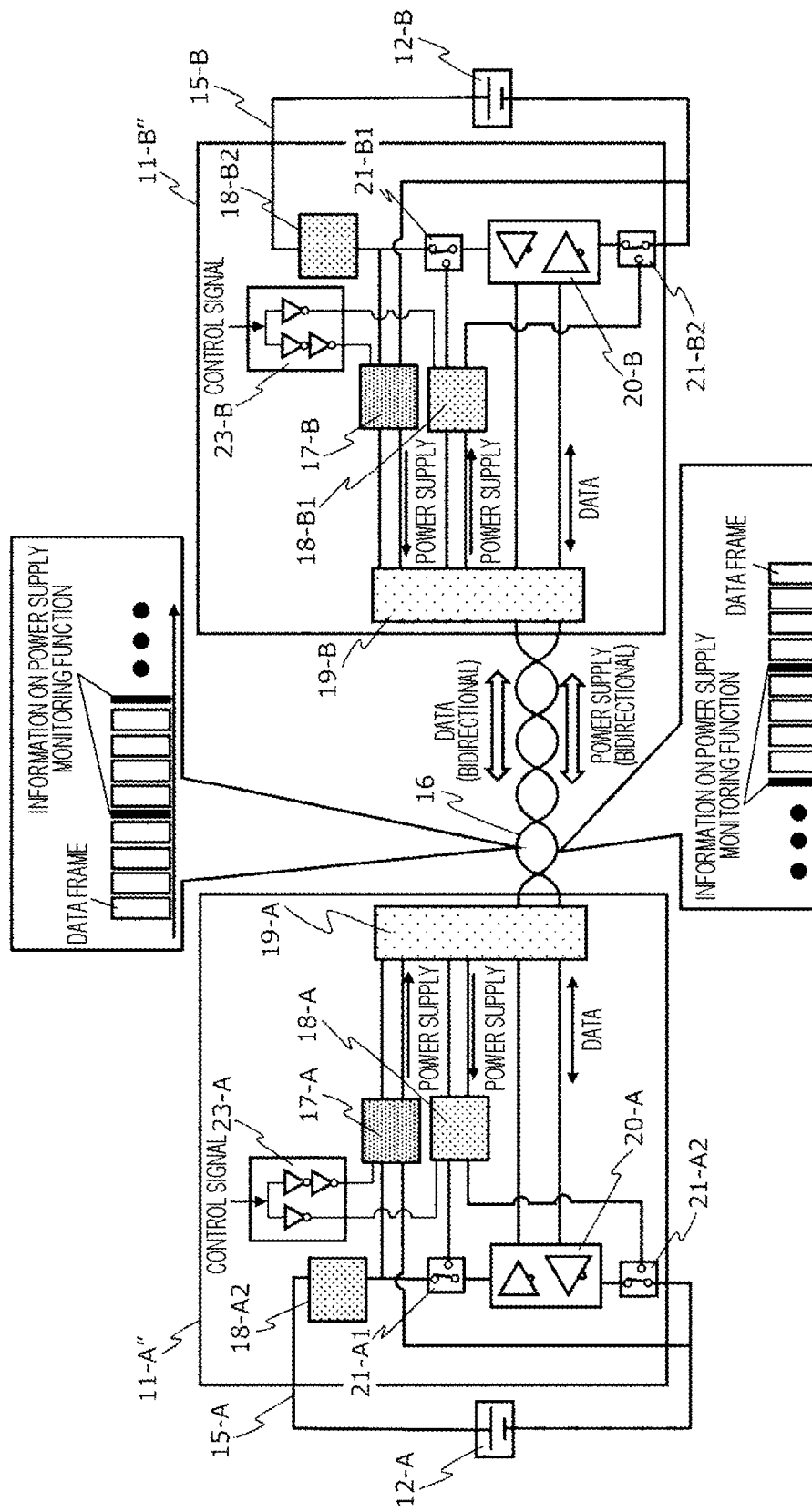
FIG. 12 is a diagram for explaining power switching in the sixth embodiment of the present invention.
Figure 13:
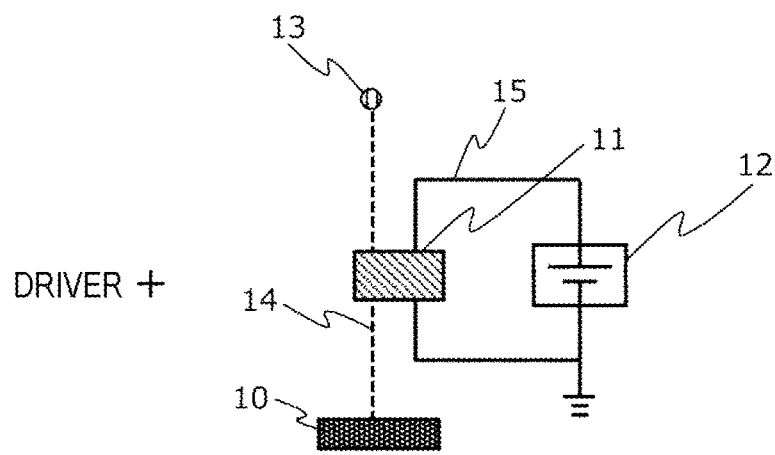
FIG. 13 is a single system configuration diagram of a driving assistance system targeted by the present invention.
Figure 14:
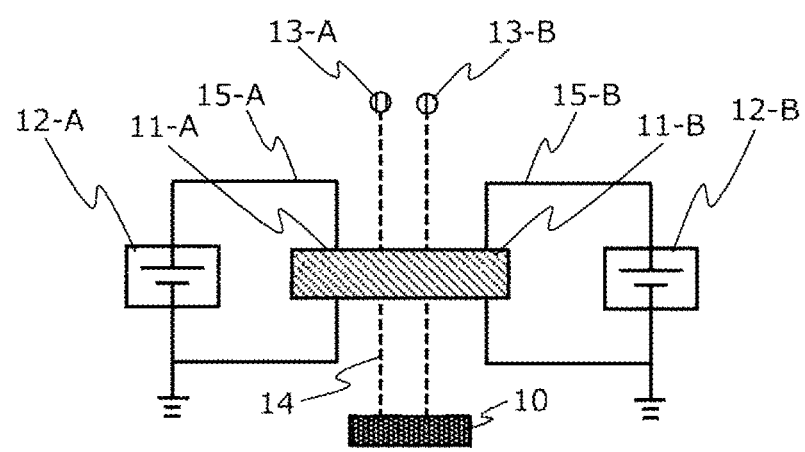
FIG. 14 is a system configuration diagram of a dual system required in autonomous driving targeted by the present invention.
Figure 15:
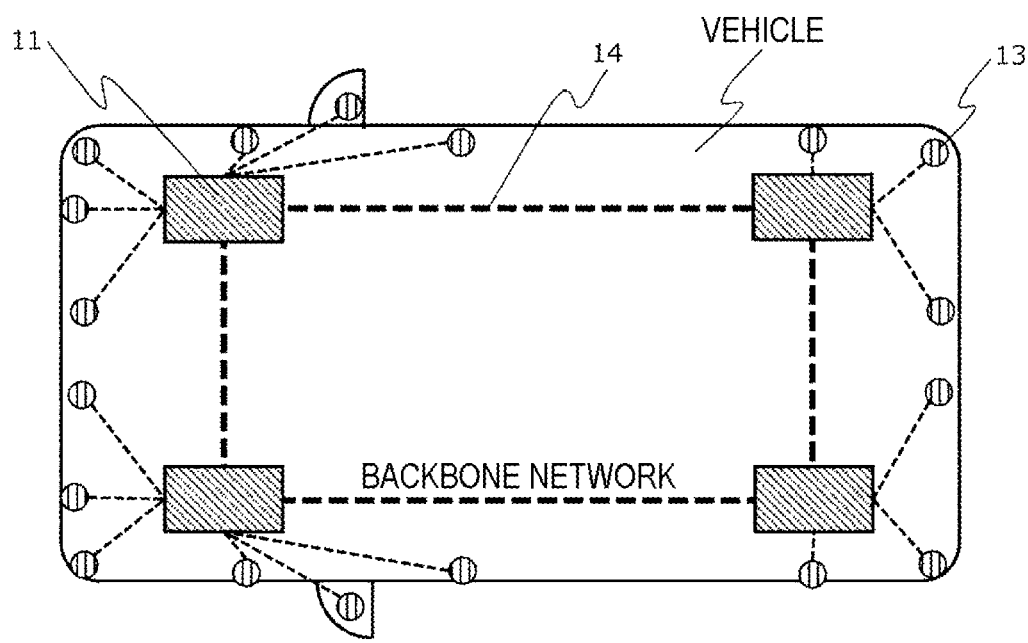
FIG. 15 is a zone architecture configuration diagram targeted by the present invention.
Figure 16:
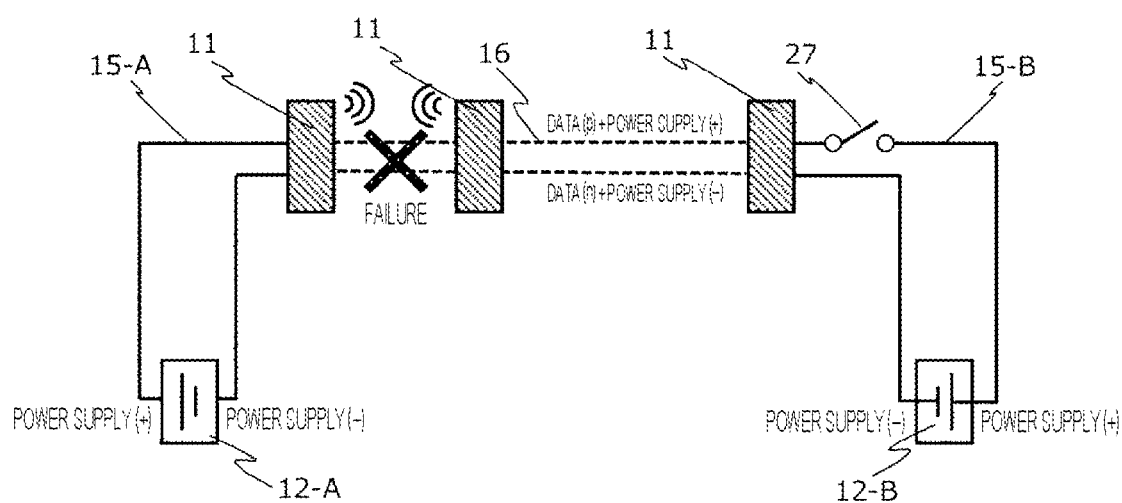
FIG. 16 is an on-vehicle network connection configuration diagram in a daisy chain targeted by the present invention.

Finally, a method of performing switching between the main power supply and the redundant power supply according to the present embodiment will be described with reference to FIG. 12. That is, in the present embodiment, either the main power supply or the redundant power supply is selected. In FIG. 12, information on a power supply monitoring function for switching is added to the configuration diagram of the electronic control device in FIG. 9. Normally, that is, when the main power supply can be secured, the electronic control devices 11-A" and 11-B" are driven by the main power supply (power storage units 12-A and 12-B), and transmit and receive a data frame conforming to a certain communication standard between the electronic control devices 11-A" and 11-B". The pieces of data are divided into a plurality of frames and caused to communicate. Therefore, monitored power supply information such as the voltage value of the main power supply of each of the electronic control devices 11-A" and 11-B" is inserted between data frames. As a result, the electronic control devices 11-A" and 11-B" that have received the power supply information can grasp the power reception situation of the main power supply of a transmission source. That is, in the present example, the electronic control devices 11-A" and 11-B" can mutually grasp the state of the main power supply of a connection destination. Therefore, the CPUs 30-A and 30-B of the electronic control devices 11-A" and 11-B" perform the monitoring and insert the power supply information. In addition, a power supply monitoring function device individually provided may be used instead of the CPUs 30-A and 30-B.

When the electronic control devices 11-A" and 11-B" transmit power supply information in which the voltage of the main power supply is lower than a threshold value, the electronic control devices 11-A" and 11-B" activate the power reception devices 18-A1 and 18-B1 to become the power reception side of the redundant power supply. In addition, when receiving the power supply information in which the voltage is lower than the threshold value, the electronic control devices 11-A" and 11-B" activate the power transmission devices 17-A and 17-B to become the power transmission side of the redundant power supply.

Note that the power supply information in which the voltage is lower than the threshold value includes a case where power reception is stopped.

The electronic control devices 11-A" and 11-B" on the power reception side change the power feeding from the main power supply to the redundant power supply. At this time, it is necessary to withstand the time until the redundant power supply is transmitted by the electronic control devices 11-A" and 11-B", and it is desirable to mount a power storage unit such as a capacitor in the electronic control devices 11-A" and 11-B".

In the present embodiment, an example in which the power supply information is periodically transmitted and received by using the CPUs 30-A and 30-B or the power supply monitoring function device has been described as the switching method, but the method is not limited as long as a configuration in which the power supply information is shared by different methods can be made. In addition, by performing the above switching with other conditions, selection between the main power supply and the redundant power supply may be performed under any conditions.

In each of the above embodiments, the on-vehicle network system has been described as an example, but application to other than vehicles is also possible. For example, application to other transportation means such as an aircraft, a ship, and a train is also possible. In addition, the present invention can also be applied to plants (factories, power plants, and the like).

Further, each embodiment can be applied to a domain architecture configuration in addition to the zone architecture configuration. Therefore, even when a zone architecture configuration and a domain architecture configuration are mixed in a vehicle or the like, the present invention can be applied to each of the zone architecture configuration and the domain architecture configuration.

REFERENCE SIGNS LIST

- 10 actuator
- 11-A, 11-B electronic control device
- 12-A, 12-B power storage unit
- 13 sensor
- 14 data wiring
- 15-A, 15-B power supply wiring
- 16 power superimposition data wiring
- 17-A, 17-B power transmission device
- 18-A1, 18-A2, 18-B1, 18-B2 power reception device
- 19 filter device
- 20-A, 20-B data transmission and reception device
- 21-A1, 21-A2, 21-B1, 21-B2 power selection switch
- 22 integrated electronic control device
- 23-A, 23-B driving control device
- 25 low-pass filter
- 26 high-pass filter
- 27 power changeover switch
- 28 sensor data wiring

The invention claimed is:

1. An on-vehicle network system including a plurality of electronic control devices that output control signals to a control target, the on-vehicle network system comprising:
   - a plurality of power supply devices that supply power to any one of the plurality of electronic control devices; and
   - a first electronic control device included in the plurality of electronic control devices, the first electronic control device including
      - a first power supply connection unit that is connected with a first power supply device included in the plurality of power supply devices via a first power supply wiring and receives power from the first power supply device, and
      - a first data wiring connection unit that is connected to a second electronic control device included in the plurality of electronic control devices via a first data wiring for transmission and reception of data,
   - wherein the second electronic control device includes
      - a second power supply connection unit that is connected to a second power supply device included in the plurality of power supply devices via a second power supply wiring and receives power from the second power supply device, and
      - a second data wiring connection unit that transmits power fed from the second power supply device to the first electronic control device via the first data wiring with being superimposed on the data.

2. The on-vehicle network system according to claim 1, wherein the second power supply connection unit is connected to the first power supply device via the first power supply wiring, and receives the power from the first power supply device.

3. The on-vehicle network system according to claim 2, wherein the second data wiring connection unit includes a second data wiring connection unit that
   - is connected to a third electronic control device included in the plurality of electronic control devices via a second data wiring for transmission and reception of data, and
   - transmits power fed from the first power supply device to the third electronic control device via the second data wiring with being superimposed on the data.

4. The on-vehicle network system according to claim 1, further comprising a third electronic control device that is included in the plurality of electronic control devices and connected to a third power supply device via a third power supply wiring,
   - wherein the second data wiring connection unit
      - is connected to the third electronic control device via a second data wiring for transmission and reception of data, and
      - receives power supplied from the third electronic control device via the second data wiring with being superimposed on the data.

5. The on-vehicle network system according to claim 1, wherein the first data wiring connection unit transmits the power fed from the first power supply device to the second electronic control device via the first data wiring with being superimposed on the data.

6. The on-vehicle network system according to claim 1, wherein the first electronic control device further includes a power selection switch that selects one of power from the first power supply device and power transmitted from the second electronic control device.

7. The on-vehicle network system according to claim 6, wherein the power selection switch selects the power from the second electronic control device when power reception from the first power supply device is stopped.

8. An electronic control device that outputs a control signal to a control target, the electronic control device comprising:
   - a power supply connection unit connected to a first power supply device included in a plurality of power supply devices via a power supply wiring; and a data wiring connection unit connected to a second electronic control device that receives power from a second power supply device, via a data wiring for transmission and reception of data, wherein the data wiring connection unit transmits power fed from the first power supply device to the second electronic control device with being superimposed on the data.

9. The electronic control device according to claim 8, wherein the power supply connection unit is connected to the second power supply device via a second power supply wiring and receives power from the second power supply device.

10. The electronic control device according to claim 9, wherein the data wiring connection unit is connected to a third electronic control device via a second data wiring for transmission and reception of data, and transmits the power received from the second power supply device to the third electronic control device via the second data wiring with being superimposed on the data.

11. The electronic control device according to claim 8, further comprising a second data wiring connection unit that is connected to a third electronic control device via a second data wiring for transmission and reception of data and receives power transmitted from the third electronic control device via the second data wiring with being superimposed on the data.

12. An electronic control device that outputs a control signal to a control target, the electronic control device comprising:

a power supply connection unit connected to a first power supply device included in a plurality of power supply devices via a power supply wiring; and a data wiring connection unit connected to a second electronic control device via a data wiring for transmission and reception of data, wherein the data wiring connection unit receives power from a second power supply device connected to the second electronic control device that superimposes the data, from the second electronic control device via the data wiring.

13. The electronic control device according to claim 12, wherein the data wiring connection unit is connected to a third electronic control device via a second data wiring, superimposes power fed from the first power supply device on the data, and transmits the power superimposed on the data to the third electronic control device via the second data wiring.

14. The electronic control device according to claim 12, wherein the data wiring connection unit superimposes power fed from the first power supply device on the data and transmits the power superimposed on the data to the second electronic control device via the data wiring.

15. The electronic control device according to claim 12, further comprising a power selection switch that selects power fed from the first power supply device via the power supply wiring and power transmitted from the second electronic control device.

16. The electronic control device according to claim 15, wherein the power selection switch selects the power from the second electronic control device when power reception from the first power supply device is stopped.

17. An on-vehicle network system that processes a control signal for a control target, the on-vehicle network system comprising:

a plurality of power supply devices;

a plurality of electronic control devices;

a power supply wiring that connects any of the plurality of electronic control devices and any of the plurality of power supply devices; and a data wiring that connects the plurality of electronic control devices with each other, superimposes power fed from any one of the plurality of power supply devices on data transmitted and received between the electronic control devices, and transmits and receives the power superimposed on the data, wherein each of the plurality of electronic control devices includes a power reception unit that receives power from the power supply wiring or the data wiring, a relationship between a total number of the plurality of electronic control devices and a total number of power supply wirings respectively connected to the plurality of electronic control devices satisfies an expression of (the number of the electronic control devices)×2>(the total number of the power supply wirings)≥(the total number of the plurality of electronic control devices), and drive power is made redundant in each of the plurality of electronic control devices.

* * * * *